US008090815B2

(12) United States Patent
Sankaran

(10) Patent No.: US 8,090,815 B2
(45) Date of Patent: *Jan. 3, 2012

(54) METHOD AND SYSTEM FOR NETWORK CONFIGURATION

(75) Inventor: Ganesh Chennimalai Sankaran, Kanchipuram (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/108,170

(22) Filed: May 16, 2011

(65) Prior Publication Data

US 2011/0219102 A1    Sep. 8, 2011

Related U.S. Application Data

(63) Continuation of application No. 11/355,612, filed on Feb. 15, 2006, now Pat. No. 7,945,651.

(51) Int. Cl.
*G06F 15/173* (2006.01)

(52) U.S. Cl. ........ 709/223; 709/220; 709/224; 709/230; 370/244; 370/254; 370/241; 370/432

(58) Field of Classification Search .................. 709/220, 709/223, 224, 230; 370/244, 254, 241, 432
See application file for complete search history.

(56) References Cited

U.S. PATENT DOCUMENTS

| 5,706,508 | A | 1/1998 | Chen et al. | |
|---|---|---|---|---|
| 6,008,805 | A | 12/1999 | Land et al. | |
| 6,185,678 | B1 * | 2/2001 | Arbaugh et al. | 713/2 |
| 6,275,853 | B1 * | 8/2001 | Beser et al. | 709/223 |
| 6,360,260 | B1 * | 3/2002 | Compliment et al. | 709/224 |
| 7,293,052 | B1 * | 11/2007 | Kavasseri | 709/229 |
| 2002/0112150 | A1 | 8/2002 | Lawing et al. | |
| 2003/0035424 | A1 * | 2/2003 | Abdollahi et al. | 370/392 |
| 2003/0165834 | A1 | 9/2003 | Chen et al. | |
| 2003/0225880 | A1 * | 12/2003 | Srivastava et al. | 709/224 |
| 2004/0153835 | A1 * | 8/2004 | Song et al. | 714/38 |
| 2005/0165834 | A1 * | 7/2005 | Nadeau et al. | 707/103 R |
| 2006/0092931 | A1 * | 5/2006 | Walter et al. | 370/389 |

FOREIGN PATENT DOCUMENTS

EP    1424808 A1    2/2004

OTHER PUBLICATIONS

Duarte, Jr., et al., "Network Fault Management Based on SNMP Agent Groups", pp. 51-56, 0-7695-1080-9/01, 2001 IEEE.
"Cisco Network Monitoring and Event Correlation Guidelines", acquired Feb. 15, 2006 at www.cisco.com/en/US/products/sw/cscowork/ps2393/prod_technical_reference09186a00800a9e2f.html, 82 pages.

* cited by examiner

*Primary Examiner* — Wing Chan
*Assistant Examiner* — Hitesh Patel
(74) *Attorney, Agent, or Firm* — Fish & Richardson P.C.

(57) ABSTRACT

Methods and systems have been provided for pushing critical configuration to a set of network devices. According to various embodiments of the invention, a Network Management Station (NMS) creates a Simple Network Management Protocol (SNMP) context and an SNMP view. Additionally, the NMS specifies a network configuration and a set time period. The NMS pushes the network configuration to the set of network devices. The set of devices apply the network configuration after the set time period.

23 Claims, 4 Drawing Sheets

METHOD AND SYSTEM FOR NETWORK CONFIGURATION

CROSS-REFERENCE TO RELATED APPLICATION

This application is a continuation application of and claims priority to U.S. application Ser. No. 11/355,612, filed on Feb. 15, 2006, the contents of which are hereby incorporated by reference.

BACKGROUND OF THE INVENTION

1. Field of Invention

Embodiments of the invention relate, in general, to network management. More specifically, embodiments of the invention relate to a method and system for the management of critical network configurations.

2. Description of the Background Art

A network management system is used to monitor and administer a network. The network may be a local area network (LAN), a wide area network (WAN), among others. In every network management system, one or more central bodies are present that manage the network management system. The central body is referred to as a network management station (NMS). The NMS is connected to one or more area networks by network infrastructure devices. Each area's network further has a plurality of network devices along with network infrastructure devices that are connected to one another and to the network management system. A network configuration is required whenever a new network device or a network infrastructure device is integrated with the network. Network configuration is also required for basic configuration changes, including reconfiguration of IP addresses across the network or application of a routing protocol, among other possibilities. In some cases, the network path from the NMS to the network or the network device is so affected that the complete network has to be reconfigured. Such cases are referred to as critical network configurations.

Pushing critical network configurations across a network is a part of network management. The network is managed with the help of a standard channel that is set across the network. The management of the network is known as in-band network management if the standard channel is used for the management. The management is known as out-of-band network management if a channel other than the standard channel is used for network management. The use of in-band management dispenses the need of setting up a separate channel for management communication. However, in-band management requires network downtime for applying network configuration. Moreover, using the out-of-band interface or the in-band redundant interface involves high administrative costs.

DETAILED DESCRIPTION OF EMBODIMENTS OF THE INVENTION

Various embodiments of the invention provide methods, systems, and computer-readable media for pushing critical network configuration to a set of devices. In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

The various embodiments of the invention provide a method for pushing critical configuration to a set of devices. Network configuration is called critical network configuration when the network paths from a Network Management Station (NMS) to one or more network devices are defined such that an entire network is re-configured. The NMS creates a Simple Network Management Protocol (SNMP) context and an SNMP view to push the configuration to the set of target devices. The NMS further creates a control entry in a Management Information Base (MIB) to provide a context name. The MIB defines all the information about network devices that the NMS can view or modify. The MIB is located on the network devices. Using the context name, the NMS specifies a network configuration for the set of target devices. This network configuration is forwarded to the set of target devices. The NMS further specifies a time period after which the network configuration is pushed on the set of devices.

Figure 1:
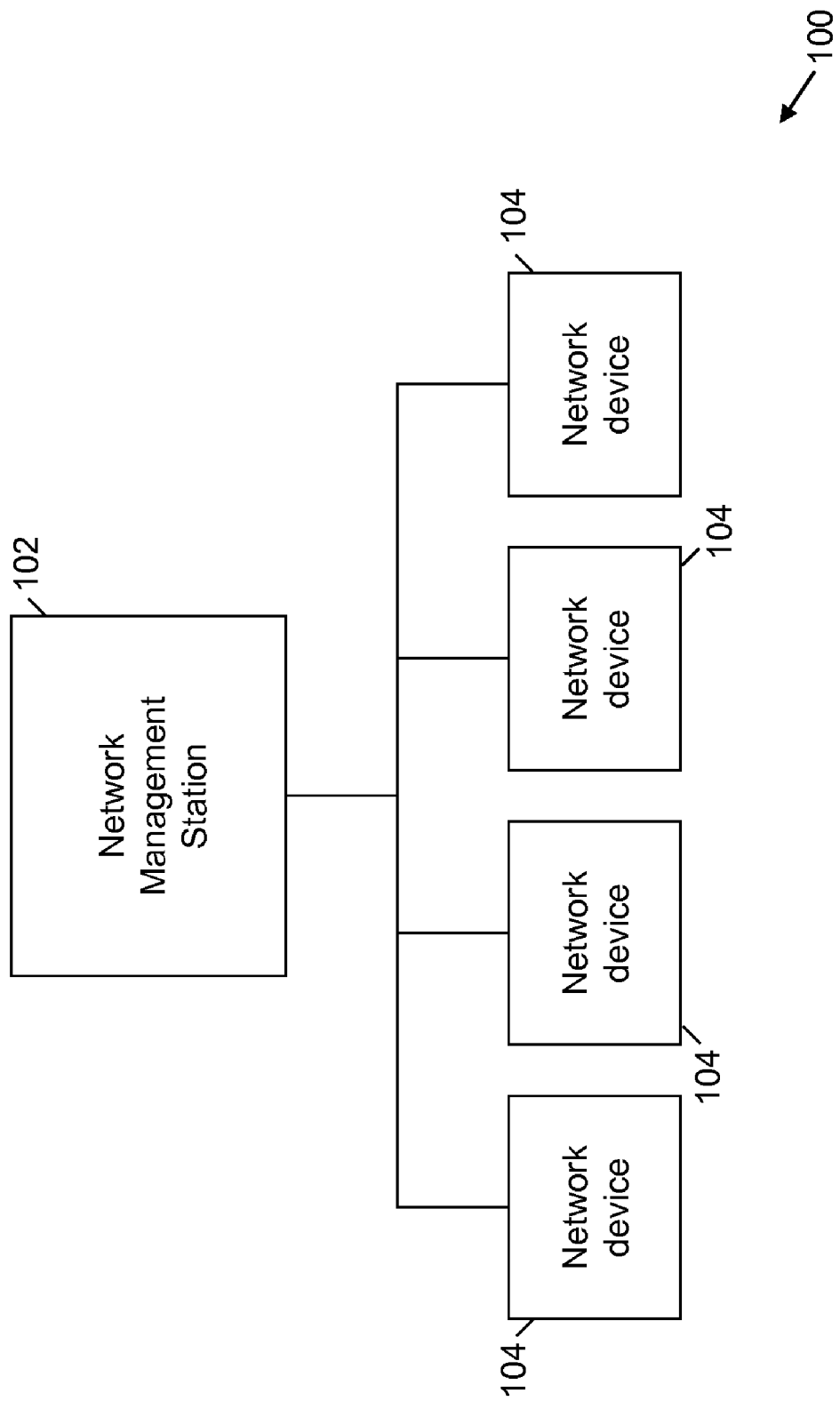
FIG. 1 illustrates an environment for pushing critical configuration to a set of devices, in accordance with an exemplary embodiment of the present invention.

Referring now to drawings, more particularly by their reference numbers, FIG. 1 illustrates environment 100 for pushing a network configuration to a set of devices, in accordance with an exemplary embodiment of the present invention. Environment 100 comprises NMS 102 and network devices 104. NMS 102 is a combination of hardware and software that is used to monitor and administer a network. The network comprises one or more interconnected network devices 104. Network devices 104 are hardware equipment in a network that are addressable and manageable by NMS 102. Examples of network devices 104 include routers, switches, personal computers, and laptops.

Figure 2:
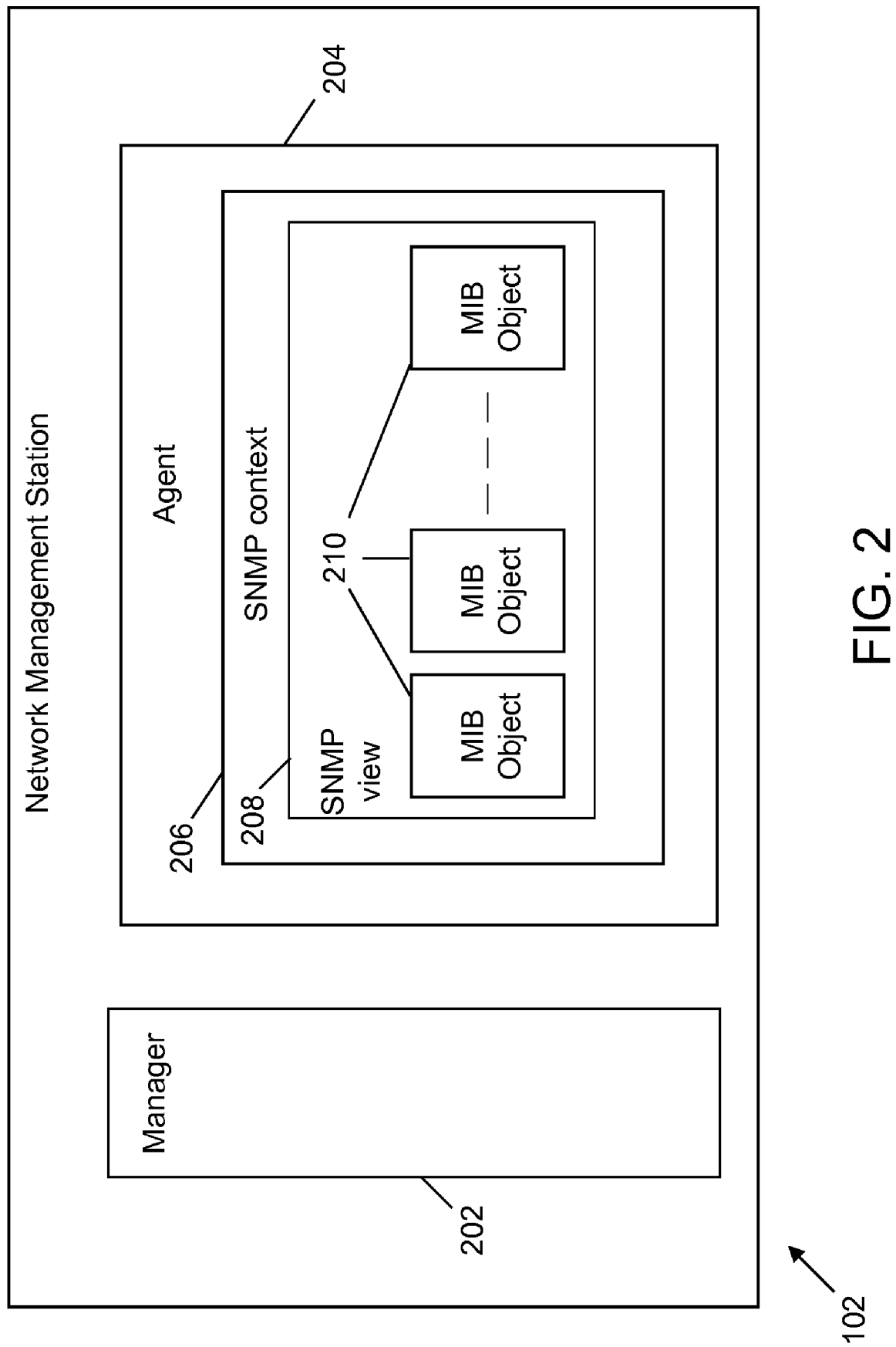
FIG. 2 is a block diagram of a network management station (NMS), in accordance with an exemplary embodiment of the present invention.

FIG. 2 is a block diagram of NMS 102, in accordance with an exemplary embodiment of the present invention. NMS 102 comprises manager 202, agent 204, SNMP context 206, SNMP view 208, and MIB objects 210. Manager 202 is a software module that manages network devices 104 and agent 204. Agent 204 is a software component within NMS 102 that maintains the data for NMS 102 and reports this data to manager 202. In an alternate embodiment, agent 204 is optional and should not be construed to limit the spirit and scope of the present invention. In an embodiment of the invention, agent 204 executes a network configuration on NMS 102. Agent 204 further comprises SNMP context 206, which is a software component managing all the SNMP commands. Further, SNMP context 206 provides NMS 102 with a secure means of accessing MIB objects. When NMS 102 is associated with a context, NMS 102 specifies that MIB data exists in that context. SNMP context 206 further comprises and supports SNMP view 208. SNMP view 208 is a software component, which allows MIB objects of NMS 102 to be examined. SNMP view 208 further comprises MIB objects 210. MIB objects 210 are instances of Object Identifiers (OID) and contain network information such as traffic statistics, error counts, and the current contents of internal data structures required by NMS 102. The network information is stored as a set of MIB variables.

Figure 3:
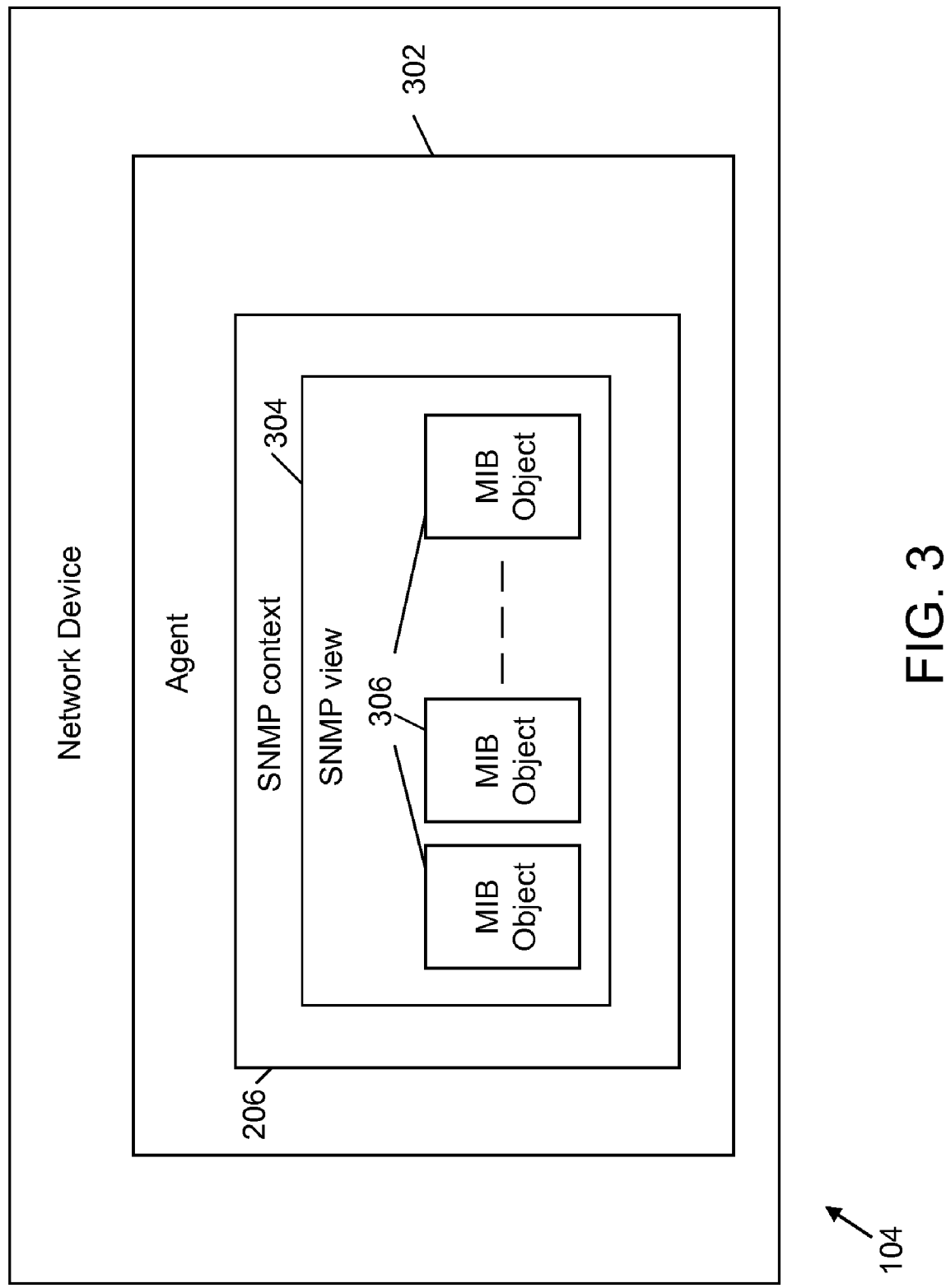
FIG. 3 is a block diagram of a network device, in accordance with an exemplary embodiment of the present invention.

FIG. 3 is a block diagram of network device 104, in accordance with an exemplary embodiment of the present invention. Network device 104 comprises agent 302, SNMP context 206, SNMP view 304, and MIB objects 306. Agent 302 is the software component within network device 104 that maintains the data for network device 104 and reports this data to manager 202. Agent 302 further comprises SNMP context 206. SNMP context 206 further comprises and supports SNMP view 304. SNMP view 304 is a software component that allows MIB objects of network device 104 to be examined. SNMP view 304 further comprises MIB objects 306. MIB objects 306 are instances of Object Identifiers (OID) and contain network information such as traffic statistics, error counts, and the current contents of internal data structures required by network device 104. The network information is stored as a set of MIB variables.

Figure 4:
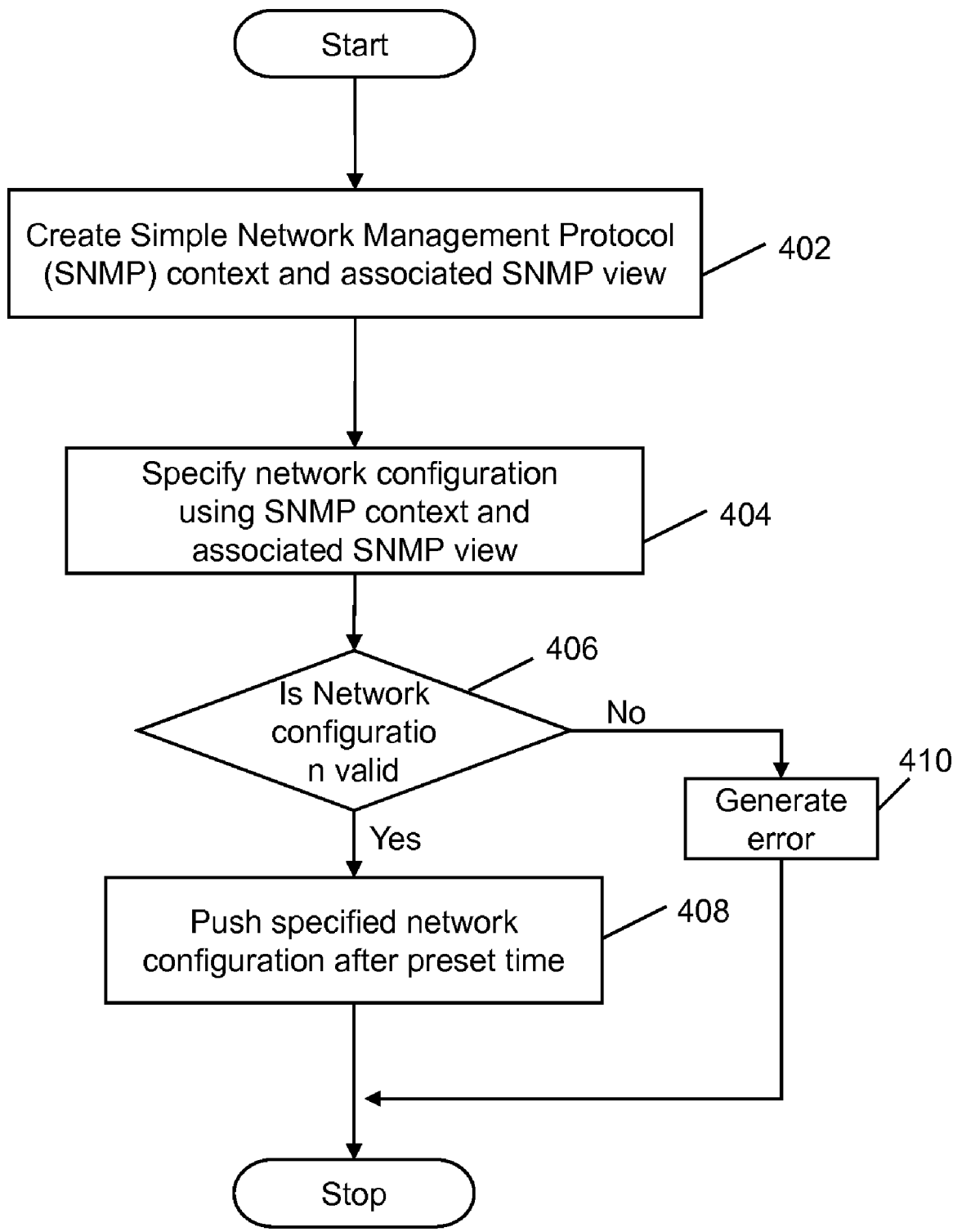
FIG. 4 is a flowchart, illustrating a method for pushing critical configuration to a set of devices, in accordance with an exemplary embodiment of the present invention.

FIG. 4 is a flowchart, illustrating a method for pushing critical configuration to a set of devices, in accordance with an exemplary embodiment of the present invention. At step 402, an SNMP context and an SNMP view are created. In an embodiment of the invention, Manager 202 creates SNMP context 206 and agent 204 creates SNMP view 208. Moreover, agent 302 generates SNMP view 304. Further, NMS 102 generates a control entry in an MIB table corresponding to SNMP context 206. The control entry provides an SNMP context name corresponding to SNMP context 206 for future references. In an alternative embodiment of the invention, if agent 302 cannot allocate SNMP context 206, then, an error is generated. If NMS 102 encounters the error, NMS 102 can wait or perform step 402 again. At step 404, a network configuration is specified, using the SNMP context. In an embodiment of the invention, manager 202 specifies the network configuration. Further, NMS 102 generates MIB objects 306 comprising the network configuration. Manager 202 decides an order in which SNMP SET commands are to be executed on network devices 104. The SNMP SET messages allow manager 202 to request a verification of the network configuration by network device 104. The SNMP SET commands are generated, using the SNMP context name. Manager 202 issues the SNMP SET commands in the specified order, for the execution of SNMP SET messages by manager 202. Further, network device that is first in the order of execution of SNMP SET messages validates the network configuration. In an embodiment of the invention, agent 302 validates the network configuration comprising MIB object 306. At step 406, if the network configuration is not valid, network device 104 generates an error at step 410. For example, the network configuration is invalid if the network configuration is an out-of-range value. If the error is generated, NMS 102 aborts the SNMP SET commands. In an embodiment of the present invention, if the error is generated, NMS 102 performs step 402 again. If the network configuration is valid, then, network device 104 returns the network configuration to NMS 102. Further, NMS 102 adds MIB object 306 to SNMP view 304. In addition, agent 302 internally maintains MIB object 306 and the sequence. Once all network devices 104 in the sequence validate the network configuration, an SNMP walk is initiated by manager 202. The SNMP walk returns all MIB objects 306 to NMS 102. At step 408, NMS 102 pushes the network configuration to network devices 104 after a specified time by NMS 102. This specified time can be specific to the implementation of an agent. In an embodiment of the present invention, a network administrator specifies the time. In an alternate embodiment of the present invention, the specified time is greater than the time taken for pushing the network configuration across all network devices 104. The time specified by NMS 102 can have default and a minimum value of 600 seconds. The pushing of the network configuration is carried out in the order decided by manager 202 at step 404. In an embodiment of the invention, network device 104 destroys the SNMP context 206 after the implementation of the network configuration. In an alternative embodiment of the invention, network device 104 generates a TRAP message, once the network configuration is committed. The TRAP message contains MIB objects 306 and the value of the network configurations.

In another embodiment of the invention, NMS 102 performs an SNMP walk, using the SNMP context name generated at step 402. The SNMP walk can be performed within the defined time interval of pushing the network configuration.

In an embodiment of the invention, an exclusive configuration locking mechanism can also be implemented in network devices 104. Once a configuration entry is activated, an exclusive lock mechanism on the network configuration is acquired. This may be desired for critical changes like reload of a network device or for basic configuration changes like reconfiguration of IP addresses across the network. Any attempt to commit other network configuration changes is prohibited and an error is generated. An exclusive lock provides manager 202 a way to lock any type of configuration changes that ensure that the network configuration changes attempted by the manager can succeed. In an alternative embodiment of the invention, a dependent configuration lock is implemented. In dependent configuration, once the network configuration is activated, any conflicting configuration change will not be accepted from a network device other than NMS 102. In yet another embodiment of the invention, the conflicting configuration is accepted but NMS 102 is informed. This conflicting configuration can be simple changes such as network device name, location or other changes where the operation of the network device is affected. In yet another embodiment of the invention, an MIB object for locking is

```
sifControlLock OBJECT-TYPE
    SYNTAX INTEGER {
        exclusiveLock{1},
        dependentLock{2},
        conflictNotify(3)
    }
    MAX-ACCESS read-write
    STATUS current
    DESCRIPTION
        "Value of this object indicates the lock method that is
        requested for the future SNMP SET operations."
    :: = (sifControlEntry 8)
```

In an embodiment of the invention, the invention can be implemented in the following manner.

```
SET-IN-FUTURE-MIB DEFINITIONS ::= BEGIN
IMPORTS
    MODULE-IDENTITY
    OBJECT-TYPE
```

```
        FROM SNMPv2-SMI;
    TimeInterval
        FROM SNMPv2-TC;
setInFutureMIB MODULE-IDENTITY
    LAST-UPDATED "200310170000Z"
    ORGANIZATION
    CONTACT-INFO
    DESCRIPTION
        "This MIB module defines the generic managed objects which
        provides functionality to schedule a set of MIB write/create
        operations in future similar to unix 'at' command."
    REVISION
    ::= ( xx )
setInFutureNotifications OBJECT-IDENTIFIER ::= ( setInFutureMIB 0 )
setInFutureMIBObjects OBJECT-IDENTIFIER ::= ( setInFutureMIB 1 )
ConfigTimeout ::= TEXTUAL-CONVENTION
    STATUS current
    DESCRIPTION
        "A period of time, measured in units of seconds. Any agent
        implementation should support the minimum timeout value of
        600
        seconds."
    SYNTAX INTEGER (600..2147483647)
--
-- The Groups
-- o sifConfig
-- o sifControl
sifConfig OBJECT-IDENTIFIER ::= ( setInFutureMIBObjects 1 )
sifControl OBJECT-IDENTIFIER ::= ( setInFutureMIBObjects 2 )
sifConfigKeepAliveTime OBJECT-TYPE
    SYNTAX TimeInterval
    MAX-ACCESS read-only
    STATUS current
    DESCRIPTION
        "Value of keepalive time in unit of hundredth of seconds. If
        no SNMP SET PDU is received within sifConfigKeepAliveTime
        from previous SNMP SET operation using this context name,
        immediately the corresponding config context and associated
        MIB object instances if any will be destroyed. This
        keepalive time is used to avoid holding the configuration
        context for ever without actually doing any configurations.
        This time interval is applicable only till the
        configControlInterval is specified."
    DEFVAL { 60000 }
    ::= ( sifConfig 1 )
sifConfigCtxtRetentionTime OBJECT-TYPE
    SYNTAX ConfigTimeout
    MAX-ACCESS read-only
    STATUS current
    DESCRIPTION
        "Value of timeout in unit of seconds. After a particular
        configuration is applied to the agent using this MIB, the
        agent will wait for configContextTimeout before destroying
        the corresponding configuration SNMP context and its
        associated MIB object instances."
    DEFVAL { 600 }
    ::= ( sifConfig 2 )
sifControlTable OBJECT-TYPE
    SYNTAX SEQUECE OF SIFControlEntry
    MAX-ACCESS not-accessible
    STATUS current
    DESCRIPTION
        "This table contains the control parameters for the set in
        future operation"
    ::= ( sifControl 1 )
sifControlEntry OBJECT-TYPE
    SYNTAX SIFControlEntry
    MAX-ACCESS not-accessible
    STATUS current
    DESCRIPTION
        "Each entry corresponds to a particular 'set in future' type
        of operation"
    INDEX ( IMPLIED sifControlOperationId )
    ::= ( sifControlTable 1 )
SIFControlEntry ::= SEQUENCE (
    sifControlIndex         Unsigned32,
    sifControlOwner         SnmpAdminString,
    sifControlInterval      Integer32,
    sifControlContextName   SnmpAdminString,
    sifControlTrapOnCompletion  TruthValue,
    sifControlStatus        TruthValue,
    sifControlRowStatus     RowStatus
)
sifControlIndex OBJECT-TYPE
    SYNTAX Unsigned32 (1.. 4294967295)
    MAX-ACCESS not-accessible
    STATUS current
    DESCRIPTION
        "Management station generates a pseudo-random number and
        creates a corresponding control entry. If the
        sifControlOperationId clashes with already existing
        entry then the management station should try creating entry
        with a different sifControlOperationId value."
    ::= ( sifControlEntry 1 )
sifControlOwner OBJECT-TYPE
    SYNTAX SnmpAdminString
    MAX-ACCESS read-create
    STATUS current
    DESCRIPTION
        "Entity that owns this entry"
    ::= ( sifControlEntry 2 )
sifControlInterval OBJECT-TYPE
    SYNTAX Integer32 (0..600000) -- to decide
    UNITS "milliseconds"
    MAX-ACCESS read-create
    STATUS current
    DESCRIPTION
        "Time in milli-seconds (refer to TimeTicks) after which this
        operation has to be executed."
    ::= ( sifControlEntry 3 )
sifControlContextName OBJECT-TYPE
    SYNTAX SnmpAdminString
    MAX-ACCESS read-only
    STATUS current
    DESCRIPTION
        "On successful creation of a sifControlEntry, a special
        sifControlContextName value is filled in by the agent. This
        SNMP context name can further be used by the management
        station to specify the actual MIB object instances and
        values that need to be applied to the device after
        sifControlInterval elapses."
    ::= ( sifControlEntry 4 )
sifControlTrapOnComplete OBJECT-TYPE
    SYNTAX TruthValue
    MAX-ACCESS read-create
    STATUS current
    DESCRIPTION
        "When this value is set to 'true' a trap message is
        generated on completion of the scheduled SET operations of
        MIB object instances and their values as specified using the
        special SNMP context name identified by
        sifControlContextName on the agent. The actual SET
        operations are performed after the value specified for
        sifControlInterval."
    DEFVAL ( false )
    ::= ( sifControlEntry 5 )
sifControlStatus OBJECT-TYPE
    SYNTAX TruthValue
    MAX-ACCESS read-only
    STATUS current
    DESCRIPTION
        "Value of this object indicates whether the scheduled SNMP
        SET operations were performed on the agent. Irrespective of
        the error encountered once the scheduled SNMP SET are
        executed, value of the object is set by the agent to 'true'.
        If the scheduled SNMP SET operations are not yet executed
        the value of this object is 'false'
    ::= ( sifControlEntry 6 )
sifControlRowStatus OBJECT-TYPE
    SYNTAX RowStatus
    MAX-ACCESS read-create
    STATUS current
    DESCRIPTION
        "Row Status object for creating a conceptual
        sifControlEntry."
    ::= ( sifControlEntry 7 )
setInFutureNotifications OBJECT-IDENTIFIER ::= ( setInFutureMIB 0 )
sifOperCompletionNotif NOTIFICATION-TYPE
    OBJECTS { sifControlStatus
        }
```

-continued

```
    MAX-ACCESS accessible for-notify
    STATUS current
    DESCRIPTION
        "A sifOperationCompletion trap is sent at the completion
        of execution of a scheduled. This trap can include the MIB
        object value pairs in a typical SNMP Response PDU if it
        were generated for SNMP SET MIB object value pairs that are
        attempted for SET using this MIB."
    ::= { setInFutureNotifications 1 }
setInFutureMIBConformance OBJECT-IDENTIFIER ::=
( setInFutureMIB 3 )
setInFutureCompliance MODULE-COMPLIANCE
    SYNTAX current
    DESCRIPTION
        "This group is mandatory for entities which support
        scheduling a list of SNMP SET operations."
    MODULE
END
```

In an embodiment of the invention, the MIB structures are defined as given below:
  configKeepAliveTime—keepalive time for SNMP SET operations.
  configCtxtRetentionTime—time to retain configuration context and associated MIB object instance after the actual configuration operation is complete.
  confiControlEntry
    configControlIndex—pseudo random number used for creating a control entry
    configControlOwner—owner of the entry
    configControInterval—time interval after which configuration will be applied
    configControlContextName—special configuration context name that should be used by management station
    configControlTrapOnCompletion—whether trap is desired after completion
    configControlStatus—status at the time of execution
    configControlRowStatus—row status for creating new conceptual entries in the table.

According to various embodiments of the present invention, a method is provided for configuring a network, the method comprises creating a Simple Network Management Protocol (SNMP) context and an associated SNMP view by a Network Management Station (NMS); creating an SNMP context name corresponding to the SNMP context; specifying a network configuration and a set time by the NMS, wherein the specifying is performed using the SNMP context name; and pushing the specified network configuration on at least one network device after the set time.

In another embodiment of the present invention, a method is provided for configuring a network, the method comprises creating a Simple Network Management Protocol (SNMP) context and an associated SNMP view by a Network Management Station (NMS); creating an SNMP context name corresponding to the SNMP context; specifying a network configuration and a set time by the NMS, wherein the specifying is performed using the SNMP context name; pushing the specified network configuration on at least one network device after the set time; and preventing a change in the network configuration of the at least one network device.

In another embodiment of the present invention, a system for network configuration is provided, the system comprises one or more network management stations (NMS), each NMS comprising: a manager, the manager adapted for managing one or more network devices; and an NMS agent for implementing a network configuration on the NMS; and one or more network devices, each network device comprising an device agent for implementing the network configuration on the network device.

In another embodiment of the present invention, an apparatus for configuring a network is provided, the apparatus comprises a processing system including a processor coupled to a display and user input device; a machine-readable medium including instructions executable by the processor comprising: one or more instructions for creating a Simple Network Management Protocol (SNMP) context and an associated SNMP view by a Network Management Station (NMS); one or more instructions for creating an SNMP context name corresponding to the SNMP context; one or more instructions for specifying a network configuration and a set time by the NMS, wherein the specifying is performed using the SNMP context name; and one or more instructions for pushing the specified network configuration on at least one network device after the set time.

Embodiments of the present invention provide a method and a system for pushing critical configuration to a set of network devices. The invention circumvents the limitations of in-band or out-of-band network interface to push the critical configuration, thereby reducing the administrative costs. Moreover, the network management server can push the critical configuration without knowing the network topologies.

Although the invention has been discussed with respect to specific embodiments thereof, these embodiments are merely illustrative, and not restrictive, of the invention. For example, a 'method for pushing critical configuration to set of devices' can include any type of analysis, manual or automatic, to anticipate the needs of pushing critical configuration to devices.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the present invention.

A 'computer readable medium' for purposes of embodiments of the present invention may be any medium that can contain, store, communicate, or transport the computer program for use by or in connection with the instruction execution system apparatus, system or device. The computer readable medium can be, by way of example only but not by limitation, an electronic, magnetic, optical, electromagnetic, infrared, or semiconductor system, apparatus, system, device, or computer memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for configuring a network, the method comprising:

creating, using a Network Management Station (NMS), a Simple Network Management Protocol (SNMP) context, an associated SNMP context name and an associated SNMP view, the NMS being configured to communicate with a plurality of network devices in the network;

specifying, using the NMS, a network configuration associated with the SNMP context and an order of the network devices, wherein the specified order comprises an order in which SNMP SET commands are executed on the network devices;

issuing, using the NMS, the SNMP SET commands in the specified order such that the network configuration associated with the SNMP context is validated by all of the network devices in the specified order;

in response to validation of the network configuration by all of the network devices, pushing, using the NMS and in the specified order, the network configuration associated with the SNMP context to each of the network devices; and performing, using the NMS, an SNMP WALK on all of the network devices to verify implementation of the network configuration associated with the SNMP context, wherein the implementation is based on the pushing, wherein the SNMP WALK is performed using the SNMP context name and within the time taken for pushing the network configuration across all of the network devices.

2. The method of claim 1, wherein creating the SNMP context further comprises creating a control entry that provides the SNMP context, the control entry being created in a Management Information Base (MIB).

3. The method of claim 1, wherein specifying the network configuration comprises:
generating, using the NMS, one or more MIB objects that are included in the network configuration;
creating, using the NMS, a sequence of SNMP SET messages, wherein the sequence is created using the SNMP context name; and
issuing, using the NMS, the SNMP SET messages on the network devices in the specified order.

4. The method of claim 3, further comprising:
executing, using a network device, the SNMP SET messages issued by the NMS, wherein the SNMP SET messages are executed by a network device in the specified order;
determining, using the network device, whether the network configuration associated with the SNMP context is valid; and
based on a determination that the network configuration is valid, returning, using the network device, the network configuration to the NMS.

5. The method of claim 4, wherein determining, using the network device, whether the network configuration associated with the SNMP context is valid further comprises validating one or more MIB objects included in the network configuration that are associated with the network device.

6. The method of claim 4, further comprising:
in response to receiving the network configuration from the network devices based on a determination that the network configuration is valid, adding, using the NMS, MIB objects associated with the network devices to the SNMP view associated with the SNMP context.

7. The method of claim 4, further comprising:
based on a determination that the network configuration is not valid, generating, using the network device, an error; and
in response to detecting the error generated by the network device, aborting, using the NMS, the SNMP SET messages.

8. The method of claim 1, wherein pushing the network configuration associated with the SNMP context further comprises:
based on committing, using a network device, the network configuration associated with the SNMP context, destroying, using the network device, the SNMP context.

9. The method of claim 1, wherein pushing the network configuration associated with the SNMP context further comprises:
based on committing, using a network device, the network configuration associated with the SNMP context, generating, using the network device, a SNMP TRAP message, wherein the SNMP TRAP message includes MIB objects associated with the network device and values associated with the network configuration.

10. The method of claim 1, wherein the pushing begins after a set time has elapsed, wherein the set time is greater than a time taken for pushing the network configuration associated with the SNMP context across all of the network devices.

11. The method of claim 10, wherein the set time is at least 600 seconds.

12. A method for configuring a network, the method comprising:
creating, using a Network Management Station (NMS), a Simple Network Management Protocol (SNMP) context, an associated SNMP context name and an associated SNMP view, the NMS being configured to communicate with a plurality of network devices in the network;
specifying, using the NMS, a network configuration associated with the SNMP context and an order of the network devices, wherein the specified order comprises an order in which SNMP SET commands are executed on the network devices;
issuing, using the NMS, the SNMP SET commands in the specified order such that the network configuration associated with the SNMP context is validated by all of the network devices in the specified order;
in response to validation of the network configuration by all of the network devices, acquiring, using the NMS, a lock mechanism on the network configuration associated with the SNMP context;
pushing, using the NMS and in the specified order, the network configuration associated with the SNMP context to each of the network devices;
performing, using the NMS, an SNMP WALK on all of the network devices to verify implementation of the network configuration associated with the SNMP context, wherein the implementation is based on the pushing, wherein the SNMP WALK is performed within the time taken for pushing the network configuration across all of the network devices; and
based on the verification of the implementation of the network configuration, destroying, using the network devices, the SNMP context.

13. The method of claim 12, wherein the pushing begins after a set time has elapsed, wherein the set time is greater than a time taken for pushing the network configuration associated with the SNMP context across all of the network devices.

14. The method of claim 12, wherein the lock mechanism is an exclusive lock mechanism that prevents other network configuration changes on the network devices while the exclusive lock mechanism is acquired.

15. The method of claim 14, wherein the exclusive lock mechanism is acquired for critical changes that are selected from a group including a reload of a network device.

16. The method of claim 14, wherein the exclusive lock mechanism is acquired for basic configuration changes that are selected from a group including a reconfiguration of IP addresses across the network.

17. The method of claim 12, wherein the lock mechanism is a dependent configuration lock that prevents a conflicting configuration change from a network device once the network configuration associated with the SNMP context is activated.

18. An apparatus for configuring a network, the apparatus comprising:
a processing system including one or more processors coupled to a display and a user input device; and
one or more instructions encoded in a non-transitory computer-readable storage medium for execution by the one or more processors, the one or more instructions when executed by the one or more processors being operable to:
create, using a Network Management Station (NMS), a Simple Network Management Protocol (SNMP) context, an associated SNMP context name and an associated SNMP view, the NMS being configured to communicate with a plurality of network devices in the network;
specify, using the NMS, a network configuration associated with the SNMP context and an order of the network devices, wherein the specified order comprises an order in which SNMP SET commands are executed on the network devices;

issue, using the NMS, the SNMP SET commands in the specified order such that the network configuration associated with the SNMP context is validated by all of the network devices in the specified order;

in response to validation of the network configuration by all of the network devices, push, using the NMS and in the specified order, the network configuration associated with the SNMP context to each of the network devices; and perform, using the NMS, an SNMP WALK on all of the network devices to verify implementation of the network configuration associated with the SNMP context, wherein the implementation is based on the pushing, wherein the SNMP WALK is performed using the SNMP context name and within the time taken for pushing the network configuration across all of the network devices.

19. The apparatus of claim 18, wherein the one or more instructions for pushing the network configuration associated with the SNMP context to each of the network devices is further configured to begin the push after a set time has elapsed, wherein the set time is greater than a time taken for pushing the network configuration associated with the SNMP context across all of the network devices.

20. An apparatus for configuring a network, the apparatus comprising:

a processing system including one or more processors coupled to a display and a user input device; and one or more instructions encoded in a non-transitory computer-readable storage medium for execution by the one or more processors, the one or more instructions when executed by the one or more processors being operable to:

create, using a Network Management Station (NMS), a Simple Network Management Protocol (SNMP) context, an associated SNMP context name and an associated SNMP view, the NMS being configured to communicate with a plurality of network devices in the network;

specify, using the NMS, a network configuration associated with the SNMP context and an order of the network devices, wherein the specified order comprises an order in which SNMP SET commands are executed on the network devices;

issue, using the NMS, the SNMP SET commands in the specified order such that the network configuration associated with the SNMP context is validated by all of the network devices in the specified order;

in response to validation of the network configuration by all of the network devices, acquire, using the NMS, a lock mechanism on the network configuration associated with the SNMP context;

push, using the NMS and in the specified order, the network configuration associated with the SNMP context to each of the network devices;

perform, using the NMS, an SNMP WALK on all of the network devices to verify implementation of the network configuration associated with the SNMP context, wherein the implementation is based on the push, wherein the SNMP WALK is performed within the time taken for pushing the network configuration across all of the network devices; and based on the verification of the implementation of the network configuration, destroy, using the network devices, the SNMP context.

21. The apparatus of claim 20, wherein the lock mechanism is an exclusive lock mechanism that prevents other network configuration changes on the network devices while the exclusive lock mechanism is acquired.

22. The apparatus of claim 20, wherein the lock mechanism is a dependent configuration lock that prevents a conflicting configuration change from a network device once the network configuration associated with the SNMP context is activated.

23. A non-transitory computer-readable storage medium including one or more instructions for execution by a processor, the one or more instructions when executed by the processor cause the processor to perform operations including:

creating, using a Network Management Station (NMS), a Simple Network Management Protocol (SNMP) context, an associated SNMP context name and an associated SNMP view, the NMS being configured to communicate with a plurality of network devices in the network;

specifying, using the NMS, a network configuration associated with the SNMP context and an order of the network devices, wherein the specified order comprises an order in which SNMP SET commands are executed on the network devices;

issuing, using the NMS, the SNMP SET commands in the specified order such that the network configuration associated with the SNMP context is validated by all of the network devices in the specified order;

in response to validation of the network configuration by all of the network devices, acquiring, using the NMS, a lock mechanism on the network configuration associated with the SNMP context;

pushing, using the NMS and in the specified order, the network configuration associated with the SNMP context to each of the network devices;

performing, using the NMS, an SNMP WALK on all of the network devices to verify implementation of the network configuration associated with the SNMP context, wherein the implementation is based on the pushing, wherein the SNMP WALK is performed within the time taken for pushing the network configuration across all of the network devices; and based on the verification of the implementation of the network configuration, destroying, using the network devices, the SNMP context.

* * * * *